(12) United States Patent
Obrecht

(10) Patent No.: US 8,664,340 B2
(45) Date of Patent: *Mar. 4, 2014

(54) NITRILE RUBBERS

(75) Inventor: Werner Obrecht, Moers (DE)

(73) Assignee: LANXESS Deutschland GmbH, Cologne (DE)

( * ) Notice: Subject to any disclaimer, the term of this patent is extended or adjusted under 35 U.S.C. 154(b) by 876 days.

This patent is subject to a terminal disclaimer.

(21) Appl. No.: 12/038,861

(22) Filed: Feb. 28, 2008

(65) Prior Publication Data

US 2008/0293869 A1  Nov. 27, 2008

(30) Foreign Application Priority Data

May 22, 2007 (DE) .......................... 10 2007 024 011

(51) Int. Cl.
  *C08F 36/02* (2006.01)
  *C08F 236/12* (2006.01)

(52) U.S. Cl.
  USPC ..... 525/329.3; 524/436; 524/439; 525/329.1; 525/329.2; 525/331.9; 525/332.5; 525/333.2; 525/360; 525/366; 525/367; 526/222; 526/224

(58) Field of Classification Search
  USPC ........... 524/436, 39; 525/329.1, 329.2, 329.3, 525/331.9, 332.5, 333.2, 360, 366, 367; 526/222, 224
  See application file for complete search history.

(56) References Cited

U.S. PATENT DOCUMENTS

| | | | | |
|---|---|---|---|---|
| 3,700,637 | A | * 10/1972 | Finch et al. | 525/329.3 |
| 3,915,909 | A | 10/1975 | Schnoring et al. | 260/17 R |
| 4,298,654 | A | 11/1981 | McCarty et al. | |
| 4,464,515 | A | 8/1984 | Rempel et al. | 525/338 |
| 4,503,196 | A | 3/1985 | Rempel et al. | 525/338 |
| 4,536,568 | A | 8/1985 | Wunder | 528/487 |
| 4,581,417 | A | 4/1986 | Buding et al. | 525/338 |
| 4,631,315 | A | 12/1986 | Buding et al. | 525/338 |
| 4,632,960 | A | 12/1986 | Sato et al. | 525/117 |
| 4,746,707 | A | 5/1988 | Fiedler et al. | 525/338 |
| 4,779,032 | A | 10/1988 | Sakaegi et al. | 318/685 |
| 4,795,788 | A | 1/1989 | Himmler et al. | 525/338 |
| 4,812,528 | A | 3/1989 | Rempel et al. | 525/338 |
| 4,826,721 | A | 5/1989 | Obrecht et al. | 428/252 |
| 4,920,176 | A | * 4/1990 | Jorgensen, Jr. | 525/185 |
| 4,978,771 | A | 12/1990 | Fiedler et al. | 558/459 |
| 5,627,250 | A | * 5/1997 | Tsuji et al. | 526/338 |
| 5,683,819 | A | * 11/1997 | Mori et al. | 428/500 |
| 6,498,223 | B2 | * 12/2002 | Sakata et al. | 526/338 |
| 6,683,136 | B2 | 1/2004 | Guo et al. | 525/329.3 |
| 2003/0236348 | A1 | 12/2003 | Wendling et al. | 524/801 |

FOREIGN PATENT DOCUMENTS

| | | |
|---|---|---|
| DE | 2539 132 | 3/1977 |
| DE | 27 51 786 | 5/1979 |
| DE | 0154 702 | 4/1982 |
| EP | 471 250 | 2/1992 |
| EP | 0 779 300 | 12/1998 |
| EP | 0 692 496 | 1/1999 |
| EP | 0 779 301 | 8/2000 |
| GB | 589248 | 6/1947 |
| GB | 785631 | 10/1957 |
| GB | 823823 | 11/1959 |
| GB | 823824 | 11/1959 |
| GB | 888040 | 1/1962 |
| JP | 7-316126 | 12/1995 |
| JP | 7-316127 | 12/1995 |
| JP | 7-316128 | 12/1995 |
| WO | 02/100905 | 12/2002 |
| WO | 02/100941 | 12/2002 |

OTHER PUBLICATIONS

M. Hofmann, Rubber Chem. Technol. 36 (1963) 1' "Vulcanize Structure, Elaxation, and Tensile Strength If Polyisoprenes" pp. 815-834.
Ullmann's Encyclopedia of Industrial Chemistry, VCH Verlagsgesellschaft, Weinheim, 1993, pp. 255-261 vol. A23, "Rubber, 3. Synthetic".
Kolloid-Z. 154, 154-167 (1957), Von H. Wenning, "Elektrolytkoagulation von Buna S3 Latex".
Houben-Weyl (1961), Methoden der Org. Chemie, Makromolekulare Stoffe 1, p. 484, H. R. Kricheldorf: Pulymerizsation von heterocyclischen Monomeren unter Ringöffnung.
Houben-Weyl (1961), Methoden der Org. Chemie, Makromolekulare Stoffe 1, p. 479 kationische, von P-Heterocyclen.
B. Welz "Atomic Absorption Spectrometry", 2nd Ed., Verlag Chemie, Weinheim (1985).
Ulllmann's Encyclopedia of Industrial Chemistry, 6th Ed., vol. 31, pp. 345-355 "Resins Natural" 5. Rosin (Colophony).
Ulllmann's Encyclopedia of Industrial Chemistry, 6th Ed., vol. 13, pp. 75-108 "Fatty Acids".
International Search Report from co-pending Application WO2008/142042 dated Nov. 27, 2008.

* cited by examiner

*Primary Examiner* — Robert C Boyle
(74) *Attorney, Agent, or Firm* — Nicanor A. Kohncke

(57) ABSTRACT

An improved polymerization and work-up process makes it possible to produce specific nitrile rubbers which have a particular ion index which is responsible for an excellent vulcanization rate and leads to vulcanizates having an advantageous property profile.

48 Claims, No Drawings

NITRILE RUBBERS

FIELD OF THE INVENTION

The invention relates to a nitrite rubber, a process for producing it, vulcanizable mixtures based on this nitrite rubber, also a process for producing vulcanizates from these mixtures and the vulcanizates obtained in this way.

BACKGROUND OF THE INVENTION

For the purposes of the present invention, nitrite rubbers, also referred to as "NBRs" for short, are rubbers which are copolymers or terpolymers of at least one α,β-unsaturated nitrite, at least one conjugated diene and optionally one or more further copolymerizable monomers.

Such nitrile rubbers and processes for producing such nitrite rubbers are known, see, for example, W. Hofmann, Rubber Chem. Technol. 36 (1963) 1 and Ullmann's Encyclopedia of Industrial Chemistry, VCH Verlagsgesellschaft, Weinheim, 1993, pp. 255-261, This publication gives no indication as to whether and if appropriate how the vulcanization rate of such rubbers and the property profile, in particular the value of the modulus, can be influenced.

NBR is produced by emulsion polymerization, which firstly gives an NBR latex. The NBR solid is isolated from this latex by coagulation. Salts and acids are used for coagulation. In the coagulation of latices by means of metal salts, it is known that significantly larger amounts of electrolyte are required in the case of monovalent metal ions, e.g. in the form of sodium chloride, than in the case of polyvalent metal ions, e.g. in the form of calcium chloride, magnesium chloride or aluminium sulphate (Kolloid-Z. 154, 154 (1957)). It is also known that the use of polyvalent metal ions leads to "at least some inclusion of the emulsifier in the product" (Houben-Weyl (1961), Methoden der Org. Chemie, Makromolekulare Stoffe 1, p. 484). According to Houben-Weyl (1961), Methoden der Org. Chemie, Makromolekulare Stoffe 1, p. 479, "not only do the electrolytes used have to be very carefully washed out again, but the finished product should also be free of the catalysts and emulsifiers of the process batch. Even small amounts of residual electrolytes rive turbid and cloudy pressed and injection-moulded parts, impair the electrical properties and increase the water absorption capacity of the finished product" (citation). Houhen-Weyl gives no indication as to how a latex has to be worked up in order to give nitrite rubbers which vulcanize quickly and display a high modulus after vulcanization.

DD 154 702 discloses a process for the free-radical copolymerization of butadiene and acrylonitrile in emulsion which is controlled by means of a specific advantageously computer-aided metering program for the monomers and the molecular weight regulators, e.g. tert-dodecyl mercaptan, and in which the latices obtained are worked up by coagulation in an acid medium to give the solid rubber. A significant advantage of the process is said to be that the resin soaps and/or fatty acid soaps used as emulsifiers remain in the rubber as a result of the use of acids in the coagulation, i.e. they are not washed out as in the case of other processes. In addition to the advantage of good properties of the NBR, the improvement in the economics of the process and the avoidance of wastewater pollution by washed-out emulsifier are specifically advertised here. It is stated that the butadiene-acrylonitrile copolymers containing 10-30% by weight of acrylonitrile obtained have good elasticity and low-temperature properties combined with an increased swelling resistance and advantageous processability. Measures by means of which the vulcanization rate of the nitrite rubber and the property profile of the vulcanized NBR can be influenced are not revealed by the teachings of this patent.

JP 27902173 (Appl. 69 32,322) discloses that the use of amines in the coagulation of latices by means of magnesium salts, for example by means of a combination of diethylenetriamine and magnesium chloride, enables the initial vulcanization rate to be reduced and thus the scorch resistance of nitrite rubbers to be improved. Further information on this subject is not to be found in this prior art.

DE-A 23 32 096 discloses that rubbers can be precipitated from their aqueous dispersions by means of methylcellulose and a water-soluble alkali metal, alkaline earth metal, aluminium or zinc salt. Preference is given to using sodium chloride as water-soluble salt. It is stated that an advantage of this process is that it gives a coagulum which is virtually completely free of extraneous constituents such as emulsifiers, catalysts residues and the like since these extraneous materials are removed together with the water when the coagulum is separated off and any remaining residues are completely washed out by means of further water. Information about the vulcanization behaviour of rubbers produced in this way is not given. In DE-A 24 25 441, the electrolyte coagulation of rubber latices is carried out using 0.1-10% by weight (based on the rubber) of water-soluble $C_2$-$C_4$ alkylcelluloses or hydroxyalkylcelluloses in combination with from 0.02 to 10% by weight (based on the rubber) of a water-soluble alkali metal, alkaline earth metal, aluminium or zinc salt as auxiliary instead of methylcellulose. Here too, preference is given to using sodium chloride as water-soluble salt. The coagulum is separated off mechanically, optionally washed with water and the remaining water is removed. Here too, it is stated that the extraneous materials are, as in DE-A 23 32 096, essentially completely removed together with the water when the coagulum is separated off and any remaining residues are washed out completely in the washing with further water.

In DE-A 27 51 786, it is established that the precipitation and isolation of rubbers from heir aqueous dispersions can be carried out by means of a smaller amount of (hydroxy)alkylcellulose when from 0.02 to 0.25% by weight of a water-soluble calcium salt is used. A further advantage is said to be that this process gives an extremely pure coagulum which is essentially completely free of extraneous constituents such as emulsifiers, catalysts residues and the like. These extraneous materials are removed together with the water when the coagulum is separated off and any remaining residues can be washed out by means of water. It is also stated that the properties of the isolated rubbers are not adversely affected by a calcium salt being used for coagulation. Rather, it is said that a rubber whose vulcanizate properties are not impaired and are fully satisfactory is obtained. This is presented as surprising since it is said that impairment of the rubber properties is frequently observed when polymers are precipitated from dispersions by means of polyvalent metal ions such as calcium or aluminium ions. Houben-Weyl (1961). Methoden der Org. Chemie, Makromolekulare Stoffe 1, pp. 484/485, is offered as evidence for the last statement. In contrast, the rubbers of DE-A 27 51 786 display no slowing or worsening of, for example, the initial vulcanization and/or full vulcanization.

None of the documents DE-A 23 32 096, DE-A 24 25 441 and DE-A 27 51 786 disclose which measures have to be taken in order to achieve rapid vulcanization and good vulcanizate properties.

As in the case of the above-described patents, the object of DE-A 30 43 688, is also to achieve a large reduction in the amounts of electrolyte required for coagulation of the latex. According to the teachings of DE-A 30 43 688, this is achieved by using either plant-based protein-like materials or polysaccharides such as starch and if appropriate water-soluble polyamine compounds as auxiliaries in addition to the inorganic coagulate in the electrolyte coagulation of latices. As inorganic coagulates, preference is given to alkali metal or alkaline earth metal salts. The specific additives make it possible to achieve a reduction in the amounts of salts used for quantitative coagulation of the latex. DE-A 3 043 688 gives no information as to how rapid vulcanization can be achieved as a result of the production and/or work-up of the nitrile rubber.

In U.S. Pat. No. 4,920,176, it is stated and evidenced by experimental data that very high sodium, potassium and calcium contents and also emulsifiers remain in the nitrile rubber in coagulation of a nitrile rubber latex by means of inorganic salts such as sodium chloride or calcium chloride. However, this is undesirable and, according to the teachings of U.S. Pat. No. 4,920,176, water-soluble cationic polymers are used instead of inorganic salts in the coagulation of nitrile rubber latices for the purpose of obtaining very pure nitrile rubber. The polymers used here are, for example, ones based on epichlorohydrin and dimethylamine. These auxiliaries are used with the aim of significantly reducing the amounts of salts remaining in the product. The vulcanizates obtained therefrom display lower swelling on storage in water and an increased electrical resistance. In the patent text, the property improvements mentioned are attributed purely qualitatively to the minimal cation contents remaining in the product. A more detailed explanation of the phenomena observed is not given. U.S. Pat. No. 4,920,176 also gives no information as to whether and how the vulcanization behaviour and the magnitude of the modulus can be controlled by means of the production and work-up of the nitrite rubber.

The objective of EP-A-1 369 436 is to provide nitrite rubbers having a high purity. In particular, the residue emulsifier contents of these nitrite rubbers are very low. The particular cation contents in the form of the sodium, potassium, magnesium and calcium contents are also very low. The nitrite rubbers are produced by carrying out the emulsion polymerization in the presence of fatty acid and/or resin acid salts as emulsifiers, then carrying out coagulation of the latex by means of acids, optionally with addition of precipitants. As acids, it is possible to use all mineral and organic acids which allow the desired pH values to be set. As additional precipitant, use is made of, for example, alkali metal salts of inorganic acids. The fatty and resin acids formed here are subsequently washed out by means of aqueous alkali metal hydroxide solutions and the polymer is finally subjected to shear until a residual moisture content of less than 210% is obtained. EP-A-1 369 436 gives no information on the production of nitrite rubbers which display rapid vulcanization and a high modulus after vulcanization.

EP-A-0 692 496, EP-A-0 779 301 and EP-A-0 779 300 in each case describe nitrite rubbers based on an unsaturated nitrite and a conjugated diene. All the nitrile rubbers contain 10-60% by weight of unsaturated nitrite and have a Mooney viscosity in the range 15-150 or, according to EP-A-0 692 496, in the range 15-65 and all have at least 0.03 mol of $C_{12}$-$C_{16}$-alkylthio group per 100 mol of monomer units, with this alkylthio group having at least three tertiary carbon atoms and a sulphur atom which is bound directly to at least one of the tertiary carbon atoms.

The nitrite rubbers are in each case produced in the presence of a $C_{12}$-$C_{16}$-alkyl thiol having a corresponding structure as molecular weight regulator which functions as "chain transfer agent" and is thus incorporated as end group into the polymer chains.

In the case of the nitrite rubbers of EP-A-0 779 300, it is stated that they have a width "ΔAN" (AN=acrylonitrile) of the composition distribution of the unsaturated nitrite in the copolymer in the range from 3 to 20. The process for producing them differs from that of EP-A-0 692 496 in that only 30-80% by weight of the total amount of monomers is used at the beginning of the polymerization and the remaining amount of monomers is fed in only at a conversion of the polymerization of 20-70% by weight.

In the case of the nitrite rubbers of EP-A-0 779 301, it is stated that they contain 3-20% by weight of a fraction having a low molecular weight and a number average molecular weight $M_n$ of less than 35 000, The process for producing them differs from that of EP-A-0 692 496 in that only 10-95% by weight of the alkyl thiol are mixed into the monomer mixture before the polymerization and the remaining amount of the alkyl thiol is fed in only after a polymerization conversion of 20-70% by weight has been reached.

With regard to the coagulation of the latex, all three patent applications EP-A-0 692 496, EP-A-0 779 301 and EP-A-0 779 300 state that any coagulants can be used. As inorganic coagulant, calcium chloride and aluminium chloride are mentioned and used. According to EP-A-0 779 301 and EP-A-0 779 300, a preferred embodiment is a nitrite rubber which is essentially halogen-free and is obtained by carrying out the coagulation of the latex in the presence of a non-ionic surface-active auxiliary and using halogen-free metal salts such as aluminium sulphate, magnesium sulphate and sodium sulphate. Coagulation using aluminium sulphate or magnesium sulphate is said to be preferred. The resulting, essentially halogen-free nitrile rubber has a halogen content of not more than 3 ppm.

In Comparative Example 6 of EP-A-779 300 and Comparative Example 7 of EP-A-0 779 301, the coagulation of the latex is carried out using a mixture of NaCl and $CaCl_2$, with the $CaCl_2$ being used in large amounts and the weight ratio of NaCl to $CaCl_2$ being 1:0.75. In respect of the scorching time and the stress at 100% elongation, no significant differences from the other examples shown in the respective Table 12 or 13 are found.

According to EP-A-692 496, EP-A-0 779 300 and EP-A-0 779 301, it is essential to use alkyl thiols in the form of the compounds 2,2,4,6,6-pentamethylheptane-4-thiol and 2,2,4,6,6,8,8-heptamethylnonane-4-thiol as molecular weight regulators for the production of the nitrile rubbers. It is clearly pointed out here that the use of the conventional known tert-dodecyl mercaptan as regulator gives nitrite rubbers having poorer properties.

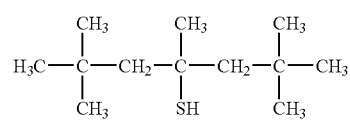

2,2,4,6,6-pentamethylheptane-4-thiol

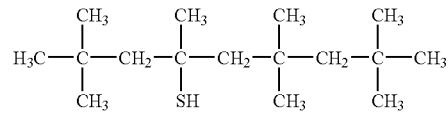

2,2,4,6,6,8,8-heptamethylnonane-4-thiol

In the case of the nitrite rubbers produced in EP-A-0 692 49, EP-A-0 779 300 and EP-A-0 779 301, it is stated that they have an advantageous property profile, good processability of the rubber mixtures and make low fouling of the mould possible during processing. The vulcanizates obtained are said to have a good combination of low-temperature resistance and oil resistance and possess good mechanical properties. It is also stated that high polymerization conversions of greater than 75%, preferably greater than 80%, in the production of the nitrile rubbers enable a high productivity to be achieved and the vulcanization rate in vulcanization using sulphur or peroxides is high, in particular in the case of NBR grades for injection moulding. It is also indicated that the nitrile rubbers have a short initial vulcanization time and a high crosslinking density. As evidence of the rapid vulcanization of the nitrile rubbers produced according to EP-A-0 692 496, EP-A-0 779 300 and EP-A-0 779 301, the initial vulcanization time (known as the "scorch time" (measured as "$T_5$")) is presented, although this is merely a measure of the initial vulcanization rate. Nothing is said about the overall vulcanization rate and how this may be able to be influenced. The crosslinking density is described only by quotation of the maximum torque value (measured as $V_{max}$).

In practice, short scorch times are not always desirable, since the corresponding rubber mixtures cannot be processed reliably because of such a fast initial vulcanization. Particularly in injection moulding, rapid initial vulcanization is not satisfactory. Short cycle times are critical for economical processing. To achieve short cycle times, the difference between full vulcanization rate and initial vulcanization rate is critical. This is measured as "$t_{90}$-$t_{10}$", with $t_{90}$ being the time at which 90% of the final vulcanization has taken place and too is the time at which 10% of the final vulcanization has taken place. However, use of the regulators 2,2,4,6,6-pentamethylheptane-4-thiol and 2,2,4,6,6,8,8-heptamethylnonane-4-thiol used in EP-A-0 692 496, EP-A-0 779 300 and EP-A-0 779 301 does not necessarily make setting of rapid vulcanization characteristics and setting of a high modulus possible.

On this subject, EP-A-0 692 496 indicates, inter alia, that many methods have already been proposed for setting high vulcanization rates. e.g. the use of minimal amounts of emulsifiers and precipitants, so that only minimal amounts of emulsifiers and precipitants remain in the NBR. However, according to EP-A-0 692 496, these measures are not satisfactory (p. 2, lines 22-28).

In summary, it may be said that, despite comprehensive literature, no measures which allow the overall vulcanization rate of nitrile rubbers and in particular the difference between full vulcanization rate and initial vulcanization rate ($t_{90}$-$t_{10}$) to be influenced without other important properties of the nitrite rubber, in particular the vulcanizate properties, being adversely affected have become known to the present time.

SUMMARY OF THE INVENTION

It was therefore an object of the present invention to provide a process which gives nitrile rubbers which allow fast initial and full vulcanization in subsequent processing and leads to vulcanizates having a good property profile.

It has surprisingly been found that nitrite rubbers having an excellent vulcanization rate and outstanding vulcanizate properties are obtained when the emulsion polymerization is carried out using specific molecular weight regulators and at the same time the coagulation of the latex is carried out in such a way that the nitrite rubbers have a specific content of cations.

DETAILED DESCRIPTION OF THE INVENTION

The present invention provides a process for producing nitrite rubbers by emulsion polymerization of at least one α,β-unsaturated nitrite, at least one conjugated diene and optionally one or more further copolymerizable monomers, with the latex which is initially obtained in the polymerization and contains the nitrite rubber being subjected to coagulation and the coagulated nitrite rubber obtained subsequently being washed, characterized in that
(i) the emulsion polymerization is carried out in the presence of at least one alkyl thiol containing 12-16 carbon atoms and at least three tertiary carbon atoms, with the sulphur being bound to one of these tertiary carbon atoms,
(ii) the pH of the latex obtained in the emulsion polymerization is set to at least 6 before coagulation and coagulation is subsequently carried out using at least one salt of a monovalent metal, with not more than 5% by weight of salts of a divalent metal, based on the total amount of all salts used for coagulation, being able to be present during the coagulation, and
(iii) a temperature of at least 50° C. is set both during the coagulation of the latex and during subsequent washing.

The present invention further provides a nitrite rubber which contains repeating units of at least one α,β-unsaturated nitrite, at least one conjugated diene and optionally one or more further copolymerizable monomers and has an ion index ("II") according to the general formula (I) in the range from 7 to 26 ppm×mol/g, $$\text{ion index} = \frac{3\,c(\text{Ca}^{2+})}{40\,\text{g/mol}} - \left[\frac{c(\text{Na}^+)}{23\,\text{g/mol}} + \frac{c(\text{K}^+)}{39\,\text{g/mol}}\right] \quad (I)$$

where $c(\text{Ca}^{2+})$, $c(\text{Na}^+)$ and $c(\text{K}^+)$ indicate the concentrations of the calcium, sodium and potassium ions in the nitrite rubber in ppm.

Nitrile rubbers having an ion index within the abovementioned limits lead to a high vulcanization rate, characterized by the difference between full vulcanization time and initial vulcanization time ($t_{90}$-$t_{10}$) and good vulcanizate properties (in particular a high modulus).

Such nitrile rubbers have not been known hitherto from the prior art.

In the examples of EP-A-1 369 436, the cation contents are given for the nitrile rubbers described. On the basis of these figures, the ion indices according to the above equation (1) can be calculated. They are considerably outside the values observed in the case of the nitrite rubbers of the invention: in Example 1 of EP-A-1 369 436, the ion index is −11.5 ppm×mol/g and that in Example 2 is 6.4 ppm×mol/g. At the same time, EP-A-1 369 436 gives no reasons for believing that the cation mix has an influence on the overall vulcanization rate, especially since EP-A-1 369 436 gives no information about the cation mix necessary to obtain a nitrile rubber having the desired high initial and full vulcanization rate together with a good property profile.

In the examples of U.S. Pat. No. 4,920,176, the cation contents are likewise indicated for the nitrite rubbers. On the basis of these figures, the ion indices can be calculated according to equation (I) above. If NaCl, which in U.S. Pat. No. 4,920,176 is designated as prior art, is used for coagulation of the latex, ion indices which are in the range from 26.5 to 44.2 ppm×mol/g and thus above the ion indices of the nitrite rubbers of the invention are obtained. If the polymeric precipitants designated in U.S. Pat. No. 4,920,176 as according to the invention are used, ion indices which are less than 3.8 ppm×mol/g and thus significantly below the ion indices of the nitrile rubbers of the present invention are obtained. Use of $MgSO_4$ in the coagulation of the latex results, according to the teachings of U.S. Pat. No. 4,920,176, in ion indices of 5.7 or 6.5 ppm×mol/g, i.e. these values, too, are significantly below the ion index according to the invention. Use of calcium chloride as precipitant results, according to U.S. Pat. No. 4,920,176, in ion indices of from 63 to 135 ppm×mol/g, i.e. far above the ion index according to the invention.

In the examples of EP-A-0 692 496, EP-A-0 779 300, EP-A-0 779 301, calcium chloride, aluminium sulphate and magnesium sulphate are used for coagulation of the latex. When sodium chloride is used in Comparative Example 6 of EP-A-779 300 or Comparative Example 7 of EP-A-0 779 301, 0.75 part by weight of calcium chloride is used per par by weight of sodium chloride. Since the calcium ion content goes into the ion index with the factor 3, it can be assumed for these experiments that the resulting nitrile rubbers have very high ion indices (see U.S. Pat. No. 4,920,176). In addition, the patent texts give no indication as to whether and in what form the mix of cations remaining in the nitrile rubber influences the vulcanization characteristics.

Determination of the Cation Contents:

To determine the cation contents for determination of the ion index II according to the present invention, the following method has proven itself and is used: 0.5 g of the nitrite rubbers are digested by dry ashing at 550° C. in a platinum crucible with subsequent dissolution of the ash in hydrochloric acid. After appropriate dilution of the digestion solution with deionized water, the metal contents are determined by ICP-OFS (inductively coupled plasma-optical emission spectrometry) at the following wavelengths:

Calcium: 317.933 nm,
Magnesium: 285,213 nm,
Potassium: 766.491 nm,
Sodium: 589.592 nm against calibration solutions matched to the acid matrix. Depending on the concentration of the elements in the digestion solution and the sensitivity of the measuring instrument used, the concentrations of the sample solutions are matched to the linear region of the calibration for the respective wavelengths used (B. Welz "Atomic Absorption Spectrometry", 2nd Ed. Verlag Chemie, Weinheim 1985).

In the ion index according to the formula (I), the metal contents are divided by the atomic weights of the respective metals. For this reason, the unit of the II is [ppm×mol/g].

The ion index is preferably in the range from 8 to 26 ppm×mol/g, particularly preferably in the range from 10 to 26 ppm×mol/g.

Nitrile Rubber:

The nitrite rubbers of the invention have repeating units of at least one $\alpha,\beta$-unsaturated nitrite, at least one conjugated diene and optionally one or more further copolymerizable monomers.

The conjugated diene can have any nature. Preference is given to using $(C_4-C_6)$-conjugated dienes. Particular preference is given to 1,3-butadiene, isoprene, 2,3-dimethylbutadiene, piperylene, 1,3-pentadiene or mixtures thereof. In particular, 1,3-butadiene or isoprene or mixtures thereof are used. Very particular preference is given to 1,3-butadiene.

As $\alpha,\beta$-unsaturated nitrite, it is possible to use any known $\alpha,\beta$-unsaturated nitrile; preference is given to $(C_3-C_5)$-$\alpha,\beta$-unsaturated nitrites such as acrylonitrile, methacrylonitrile, 1-chloroacrylonitrile, ethacrylonitrile or mixtures thereof. Particular preference is given to acrylonitrile.

A particularly preferred nitrite rubber is thus a copolymer of acrylonitrile and 1,3-butadiene.

Apart from the conjugated diene and the $\alpha,\beta$-unsaturated nitrite, one or more further copolymerizable monomers. e.g. $\alpha,\beta$-unsaturated monocarboxylic or dicarboxylic acids, their esters or amides, can be additionally used. Such nitrile rubbers are customarily also referred to as carboxylated nitrile rubbers, or "XNBRs" for short.

As $\alpha,\beta$-unsaturated monocarboxylic or dicarboxylic acids, it is possible to use, for example, fumaric acid, maleic acid, acrylic acid, methacrylic acid, crotonic acid and itaconic acid. Preference is given to maleic acid, acrylic acid, methacrylic acid and itaconic acid.

As esters of $\alpha,\beta$-unsaturated carboxylic acids, use is made of, for example, alkyl esters, alkoxyalkyl esters, hydroxyalkyl esters or mixtures thereof.

Particularly preferred alkyl esters of $\alpha,\beta$-unsaturated carboxylic acids are methyl(meth)acrylate, ethyl(meth)acrylate, propyl(meth)acrylate, n-butyl(meth)acrylate, t-butyl(meth)acrylate, hexyl(meth)acrylate, 2-ethylhexyl(meth)acrylate, octyl(meth)acrylate and lauryl(meth)acrylate. In particular, n-butyl acrylate is used.

Particularly preferred alkoxyalkyl esters of $\alpha,\beta$-unsaturated carboxylic acids are methoxyethyl(meth)acrylate, ethoxyethyl(meth)acrylate and methoxyethyl(meth)acrylate. In particular, methoxyethyl acrylate is used.

Particularly preferred hydroxyalkyl esters of $\alpha,\beta$-unsaturated carboxylic acids are hydroxyethyl(meth)acrylate, hydroxypropyl(meth)acrylate and hydroxybutyl(meth)acrylate.

Further esters of $\alpha,\beta$-unsaturated carboxylic acids which can be used are, for example, polyethylene glycol (meth)acrylate, polypropylene glycol (meth)acrylate, glycidyl (meth)acrylate, epoxy(meth)acrylate and urethane (meth)acrylate.

Further possible monomers are vinylaromatics such as styrene, $\alpha$-methylstyrene and vinylpyridine. The proportions of conjugated diene and $\alpha,\beta$-unsaturated nitrite in the nitrite rubbers of the invention can vary within a wide range. The proportion of the conjugated diene or of the sum of conjugated dienes is usually in the range from 20 to 95% by weight, preferably in the range from 40 to 90% by weight, particularly preferably in the range from 60 to 85% by weight, based on the total polymer. The proportion of the $\alpha,\beta$-unsaturated nitrile or of the sum of $\alpha,\beta$-unsaturated nitriles is usually from 5 to 80% by weight, preferably from 10 to 60% by weight, particularly preferably from 15 to 40% by weight, based on the total polymer. The proportions of the monomers in each case add up to 100% by weight.

The additional monomers can be present in amounts of from 0 to 40% by weight, preferably from 0.1 to 40% by weight, particularly preferably from 1 to 30% by weight, based on the total polymer. In this case, corresponding proportions of the conjugated diene or dienes and/or of the $\alpha,\beta$-unsaturated nitrite or nitrites are replaced by proportions of these additional monomers, with the proportions of all monomers continuing to add up to 100% by weight.

If esters of (meth)acrylic acid are used as additional monomers, they are usually used in amounts of from 1 to 25% by weight.

If $\alpha,\beta$-unsaturated monocarboxylic or dicarboxylic acids are used as additional monomers, they are usually used in amounts of less than 10% by weight.

The nitrogen content of the nitrite rubbers of the invention is determined by the Kjeldahl method in accordance with DIN 53 625. Owing to the content of polar comonomers, the nitrite rubbers are usually soluble in methyl ethyl ketone to an extent of >85% by weight at 20° C.

The nitrile rubbers have Mooney viscosities (ML (1+4@100° C.)) of from 10 to 150, preferably from 20 to 100, Mooney units. The Mooney viscosity (ML (1+4@100° C.)) is determined at 100° C. by means of a shear disc viscosimeter in accordance with DIN 53523/3 or ASTM D 1646.

The glass transition temperatures of the nitrile rubbers are in the range from −70° C. to +10° C. preferably in the range from −60° C. to 0° C.

Preference is given to nitrite rubbers according to the invention which comprise repeating units of acrylonitrile, 1,3-butadiene and optionally of one or more further copolymerizable monomers. Preference is likewise given to nitrile rubbers having repeating units of acrylonitrile, 1,3-butadiene and one or more $\alpha,\beta$-unsaturated monocarboxylic or dicarboxylic acids, their esters or amides, and in particular repeating units of an alkylester of an $\alpha,\beta$-unsaturated carboxylic acid, very particularly preferably of methyl(meth)acrylate, ethyl(meth)acrylate, propyl(meth)acrylate, n-butyl(meth) acrylate, t-butyl(meth)acrylate, hexyl(meth)acrylate, 2-ethylhexyl(meth)acrylate, octyl(meth)acrylate or lauryl(meth) acrylate.

Process for Producing the Nitrite Rubbers:

The nitrile rubbers are produced by emulsion polymerization in the process of the invention.

As emulsifiers, it is possible to use water-soluble salts of anionic emulsifiers or uncharged emulsifiers. Preference is given to using anionic emulsifiers.

As anionic emulsifiers, it is possible to use modified resin acids which are obtained by dimerization, disproportionation, hydrogenation and modification of resin acid mixtures containing abietic acid, neoabietic acid, palustric acid, laevopimaric acid. A particularly preferred modified resin acid is disproportionated resin acid (Ullmann's Encyclopedia of Industrial Chemistry, 6th Edition, Volume 31, pp. 345-355).

It is also possible to use fatty acids as anionic emulsifiers. These contain from 6 to 22 carbon atoms per molecule. They can be fully saturated or have one or more double bonds in the molecule. Examples of fatty acids are caproic acid, lauric acid, myristic acid, palmitic acid, stearic acid, oleic acid, linoleic acid, linolenic acid. The carboxylic acids are usually based on origin-specific oils or fats such as caster oil, cottonseed oil, peanut oil, linseed oil, coconut oil, palm kernel oil, olive oil, rapeseed oil, soybean oil, fish oil and beef talo, etc. (Ullmann's Encyclopedia of Industrial Chemistry, 6th Edition, Volume 13, pp. 75-108). Preferred carboxylic acids are derived from coconut fatty acid and from beef talo and are partially or fully hydrogenated.

Such carboxylic acids based on modified resin acids or fatty acids are used as water-soluble lithium, sodium, potassium and ammonium salts. The sodium and potassium salts are preferred.

Further anionic emulsifiers are sulphonates, sulphates and phosphates which are bound to an organic radical. Possible organic radicals are aliphatic radicals, aromatic radicals, alkylated aromatics, fused aromatics and methylene-bridged aromatics, with the methylene-bridged and fused aromatics being able to be additionally alkylated. The length of the alkyl chains is from 6 to 25 carbon atoms. The length of the alkyl chains bound to the aromatics is from 3 to 12 carbon atoms.

The sulphates, sulphonates and phosphates are used as lithium, sodium, potassium and ammonium salts. The sodium, potassium and ammonium salts are preferred.

Examples of such sulphonates, sulphates and phosphates are Na laurylsulphate, Na-alkylsulphonate. Na-alkylarylsulphonate, Na salts of methylene-bridged aryl sulphonates, Na salts of alkylated naphthalenesulphonates and the Na salts of methylene-bridged naphthalenesulphonates which can also be oligomerized, with the degree of oligomerization being in the range from 2 to 10. The alkylated naphthalenesulphonic acids and the methylene-bridged (and optionally alkylated) naphthalenesulphonic acids are usually present as mixtures of isomers which can also contain more than 1 sulphonic acid group (from 2 to 3 sulphonic acid groups) in the molecule. Particular preference is given to Na laurylsulphate, Na alkylsulphonate mixtures having from 12 to 18 carbon atoms, Na alkylarylsulphonates, Na diisobutylenenaphthalenesulphonate, methylene-bridged polynaphthalenesulphonate mixtures and methylene-bridged arylsulphonate mixtures.

Uncharged emulsifiers are derived from addition products of ethylene oxide and of propylene oxide onto compounds having a sufficiently acidic hydrogen. These include, for example, phenol, alkylated phenol and alkylated amines. The average degrees of polymerization of the epoxides are in the range from 2 to 20. Examples of uncharged emulsifiers are ethoxylated nonylphenols having 8, 10 and 12 ethylene oxide units. The uncharged emulsifiers are usually not used alone but in combination with anionic emulsifiers.

Preference is given to the Na and K salts of disproportionated abietic acid and of partially hydrogenated talo fatty acid and also mixtures thereof, sodium laurylsulphate, Na alkylsulphonates, sodium alkylbenzenesulphonate and also alkylated and methylene-bridged naphthalenesulfonic acids.

The emulsifiers are used in an amount of from 0.2 to 15 parts by weight, preferably from 0.5 to 12.5 parts by weight, particularly preferably from 1.0 to 10 parts by weight, per 100 parts by weight of the monomer mixture.

The emulsion polymerization is carried out using the emulsifiers mentioned. If latices which due to some instability tend to premature self-coagulation are obtained after the polymerization, the emulsifiers mentioned can also be used for afterstabilization of the latices. This can, in particular, be necessary before removal of unreacted monomers by treatment with steam or before storage of the latex.

To regulate the molecular weight of the nitrite rubber formed, use is made of at least one alkyl thiol which contains 12-16 carbon atoms and at least three tertiary carbon atoms with the sulphur being bound to one of these tertiary carbon atoms. These mercaptans can be used either individually or in mixtures. Suitable mercaptans are, for example, the addition compounds of hydrogen sulphide onto oligomerized propene, in particular tetrameric propene, or onto oligomerized isobutene, in particular rimeric isobutene, which are frequently referred to as tertiary dodecyl mercaptan ("t-DDM") in the literature.

Such alkyl thiols or (isomer) mixtures of alkyl thiols are either commercially available or can be prepared by a person skilled in the art using methods which are adequately described in the literature (see, for example, JP 07-316126, JP 07-316127 and JP 07-316128 and also GB 823,823 and GB 823,824).

A preferred example of an alkyl thiol which comes within the above definition is 2,2,4,6,6,8,8-pentamethylheptane-4-thiol.

Furthermore, particular preference is given to a novel mixture of $C_{12}$-mercaptans containing
2,2,4,6,6-pentamethylheptane-4-thiol,
2,4,4,6,6-pentamethylheptane-2-thiol,
2,3,4,6,6-pentamethylheptane-2-thiol and
2,3,4,6,6-pentamethylheptane-3-thiol,
which together with a process for preparing it as described in a patent application of Lanxess Deutschland GmbH filed on the same day. This specific novel mixture is preferably obtained by reaction of hydrogen sulphide with triisobutene at temperatures in the range from 0° C. to −60° C. in a continuous process in which (a) the hydrogen sulphide is subjected to drying before the reaction,
(b) the triisobutene used has a water content of not more than 70 ppm,
(c) boron trifluoride is used as catalyst in amounts of not more than 1.5% by weight, based on the triisobutene used.
(d) the reaction is carried out in the absence of compounds which form complexes with boron trifluoride and
(e) the reaction mixture is brought into contact with an aqueous alkali solution after the reaction to remove the catalyst.

The molecular weight regulator is used in an amount of from 0.05 to 3 parts by weight, preferably from 0.1 to 1.5 parts by weight, per 100 parts by weight of the monomer mixture. It is possible to use either individual regulators or mixtures of various regulators.

The molecular weight regulator or molecular weight regulator mixture is introduced either at the beginning of the polymerization or else in portions during the polymerization, with preference being given to addition of all or individual components of the regulator mixture in portions during the polymerization.

Owing to its function, the molecular weight regulator is to a certain extent present in the form of end groups in the nitrite rubber. i.e. the nitrite rubber has a certain amount of alkyl thiol end groups. When the above-described novel mixture of $C_{12}$-mercaptans is used, these end groups are thus the corresponding thiol end groups of the thiols present in the regulator mixture, i.e. 2,2,4,6,6-pentamethylheptane-4-thio and/or 2,4,4,6,6-pentamethylheptane-2-thio and/or 2,3,4,6,6-pentamethylheptane-2-thio and/or 2,3,4,6,6-pentamethylheptane-3-thio end groups.

Initiation of the emulsion polymerization is typically carried out using polymerization initiators which disintegrate into free radicals. As such initiators include compounds which contain an —O—O— unit (peroxo compounds) or an —N≡N— unit (azo compound).

The peroxo compounds include hydrogen peroxide, peroxodisulphates, peroxodiphosphates, hydroperoxides, peracids, peracid esters, peracid anhydrides and peroxides having two organic radicals. Suitable salts of peroxodisulphuric acid and of peroxodiphosphoric acid are the sodium, potassium and ammonium salts. Suitable hydroperoxides are, for example, t-butyl hydroperoxide, cumene hydroperoxide and p-menthane hydroperoxide. Suitable peroxides having two organic radicals are dibenzoyl peroxide, bis-2,4-dichlorobenzoyl peroxide, di-t-butyl peroxide, dicumyl peroxide, t-butyl perbenzoate, t-butyl peracetate, etc. Suitable azo compounds are azobisisobutyronitrile, azobisvaleronitrile and azobiscyclohexanenitrile.

Hydrogen peroxide, hydro peroxides, peracids, peracid esters, peroxodisulphate and peroxodisphosphate are also used in combination with reducing agents. Suitable reducing agents are sulphenates, sulphinates, sulphoxylates, dithionite, sulphite, metabisulphite, disulphite, sugar, urea, thiourea, xanthogenates, thioxanthogenates, hydrazinium salts, amines and amine derivatives such as aniline, dimethylaniline, monoethanolamine, diethanolamine or triethanolamine. Initiator systems consisting of an oxidizing agent and a reducing agent are referred to as redox systems. When redox systems are employed, salts of transition metals such as iron, cobalt or nickel are frequently also used in combination with suitable complexing agents such as sodium ethylenediaminetetraacetate, sodium nitrilotriacetate and trisodium phosphate or tetrapotassium diphosphate.

Preferred redox systems are: 1) potassium peroxodisuiphate in combination with triethanolamine, 2) ammonium peroxodiphosphate in combination with sodium metabisulphite ($Na_2S_2O_5$), 3) p-methane hydroperoxide/sodium formaldehydesulphoxylate in combination with Fe(II) sulphate ($FeSO_4 \cdot 7H_2O$), sodium ethylenediaminoacetate and trisodium phosphate, 4) cumene hydroperoxide/sodium formaldehydesulphoxylate in combination with Fe(II) sulphate ($FeSO_4 \cdot 7H_2O$), sodium ethylenediaminoacetate and tetrapotassium disphosphate.

The amount of oxidizing agent is from 0.001 to 1 part by weight per 100 parts by weight of monomer. The molar amount of reducing agent is in the range from 50% to 50%, based on the molar amount of the oxidizing agent used.

The molar amount of complexing agents is based on the amount of transition metal used and is usually equimolar with this.

To carry out the polymerization, all or individual components of the initiator system are introduced at the beginning of the polymerization or during the polymerization.

The addition of all or individual components of the initiator system in portions during the polymerization is preferred. The sequential addition enables the reaction rate to be controlled.

The polymerization time is in the range from 5 h to 15 h and depends essentially on the acrylonitrile content of the monomer mixture and on the polymerization temperature.

The polymerization temperature is in the range from 0 to 30° C. preferably in the range from 5 to 25° C.

After conversions in the range from 50 to 90%, preferably in the range from 70 to 85%, have been reached, the polymerization is stopped.

For this purpose, a stopper is added to the reaction mixture. Suitable stoppers are, for example, dimethyl dithiocarbamate, Na nitrite, mixtures of dimethyl dithiocarbamate and Na nitrite, hydrazine and hydroxylamine and also salts derived therefrom. e.g. hydrazinium sulphate and hydroxylammonium sulphate, diethylhydroxylamine, diisopropylhydroxylamine, water-soluble salts of hydroquinone, sodium dithionite, phenyl-α-naphthylamine and aromatic phenols such as tert-butylcatechol or phenothiazine.

The amount of water used in the emulsion polymerization is in the range from 100 to 900 parts by weight, preferably in the range from 120 to 50 parts by weight, particularly preferably in the range from 150 to 0 parts by weight, of water per 100 parts by weight of the monomer mixture.

To reduce the viscosity during the polymerization, to adjust the pH and also as pH buffer, salts can be added to the aqueous phase in the emulsion polymerization. Typical salts are salts of monovalent metals in the form of potassium and sodium hydroxide, sodium sulphate, sodium carbonate, sodium hydrogencarbonate, sodium chloride and potassium chloride. Preference is given to sodium and potassium hydroxide, sodium hydrogencarbonate and potassium chloride. The amounts of these electrolytes are in the range from 0 to 1 part by weight, preferably from 0 to 0.5 part by weight, per 100 parts by weight of the monomer mixture.

The polymerization can be carried out either batchwise or continuously in a cascade of stirred vessels.

To achieve a uniform course of the polymerization, only part of the initiator system is used to start the polymerization and the remainder is fed in during the polymerization. The polymerization is usually started using from 10 to 80% by weight, preferably 30-50% by weight, of the total amount of initiator. The introduction of individual constituents of the initiator system after commencement of the polymerization is also possible.

If chemically uniform products are to be produced, further acrylonitrile or butadiene is introduced when the composition goes outside the azeotropic butadiene/acrylonitrile ratio. Further introduction is preferably carried out in the case of NBR grades having acrylonitrile contents of from 10 to 34% by weight and in the case of grades containing from 40 to 50% by weight of acrylonitrile (W. Hofmann, Rubber Chem. Technol. 36 (1963) 1). The further introduction is, as indicated, for example, in DD 154 702, preferably carried out under computer control on the basis of a computer program.

To remove unreacted monomers and volatile constituents, the stopped latex is subjected to a steam distillation. Here, temperatures in the range from 70° C. to 150° C. are employed, with the pressure being reduced at temperatures of <100° C.

Before removal of the volatile constituents, the latex can be after-stabilized by means of an emulsifier. For this purpose, it is advantageous to use the abovementioned emulsifiers in amounts of from 0.1 to 2.5% by weight, preferably from 0.5 to 2.0% by weight, per 100 parts by weight of nitrile rubber.
Coagulation of the Latex.

Before or during coagulation of the latex, one or more ageing inhibitors can be added to the latex. Phenolic, amine and other ageing inhibitors are suitable for this purpose.

Suitable phenolic ageing inhibitors are alkylated phenols, styrenized phenol, sterically hindered phenols such as 2,6-di-tert-butylphenol, 2,6-di-tert-butyl-p-cresol (BHT), 2,6-di-tert-butyl-4-ethylphenol, sterically hindered phenols containing ester groups, sterically hindered phenols containing thioethers, 2,2'-methylenebis(4-methyl-6-tert-butylphenol) (BPH) and sterically hindered thiobisphenols.

If discoloration of the rubber is of no importance, amine ageing inhibitors, e.g. mixtures of diaryl-p-phenylenediamines (DTPD), octylated diphenylamine (ODPA), phenyl-α-naphthylamine (PAN), phenyl-β-naphthylamine (PBN), preferably ones based on phenylenediamine, are also used. Examples of phenylenediamines are N-isopropyl-N'-phenyl-p-phenylenediamine, N-1,3-dimethylbutyl-N'-phenyl-p-phenylenediamine (6PPD), N-1,4-dimethylpentyl-N'-phenyl-p-phenylenediamine (7PPD), N,N'-bis-1,4-(1,4-dimethylpentyl)-p-phenylenediamine (77PD), etc.

The other ageing inhibitors include phosphites such as tris(nonylphenyl)phosphite, polymerized 2,2,4-trimethyl-1,2-dihydroquinoline (TMQ), 2-mercaptobenzimidazole (MBI), methyl-2-mercaptobenzimidazole (MBI), zinc methylmercaptobenzimidazole (ZMMBI). The phosphites are generally used in combination with phenolic ageing inhibitors. TMQ, MBI and NIMBI are used particularly for NBR grades which are vulcanized peroxidically.

The latex having a pH of at least 6, preferably >6, is used for the coagulation. If appropriate, this pH is set by addition of a base, preferably ammonia or sodium hydroxide or potassium hydroxide.

At least one salt of a monovalent metal, preferably at least one salt of sodium or potassium, is used for the coagulation of the latex.

Suitable salts are, for example, halides of a monovalent metal, e.g. sodium chloride and potassium chloride, nitrates of a monovalent metal, e.g. sodium nitrate and potassium nitrate, or sulphates of a monovalent metal, e.g. sodium sulphate and potassium sulphate.

Preference is given to using the salt of a monovalent metal cation with a monovalent anion. Particular preference is given to sodium chloride.

It is also possible to use a mixture of two or more salts of a monovalent metal. These can be different salts of the same monovalent metal or various salts of various monovalent metals.

In the coagulation of the latex, a maximum of 5% by weight of salts of a divalent metal, based on the total amount of all salts used for the coagulation, is allowed to be present, preferably not more than an amount below 5% by weight and particularly preferably not more than an amount below 3% by weight.

If only sodium chloride is used as salt of a monovalent metal, calcium chloride can be present in the process of the invention in amounts of not more than 5% by weight, preferably in amounts of less than 5% by weight and particularly preferably in amounts of less than 3% by weight.

If potassium chloride is used in addition to sodium chloride for coagulation of the NBR, the amount of potassium chloride is preferably X % by weight, with the value of X % by weight being 40% by weight minus the % by weight of any $CaCl_2$ present.

The concentration of the salt solution is usually from 3 to 30% by weight. The salt solution can be prepared using either deionized water (in industry frequently also referred to as "DW" for short) or water which has not been deionized and thus contains Ca ions (in industry frequently also referred to as "BW" for short). DW is usually produced from BW by treatment with ion exchangers or by distillation. If deionized water is used for the preparation of the salt solution, it has been found to be useful to use Ca-containing washing water in the subsequent washing of the coagulated nitrite rubber. Preference is given to using Ca-containing water, BW, for the preparation of the salt solution for the coagulation.

The amount of the salt or salts of the monovalent metal necessary for coagulation of the latex is 1-200 parts by weight, preferably 5-150 parts by weight, particularly preferably 11100 parts by weight, per 100 parts by weight of nitrite rubber.

The coagulation of the latex can be achieved by adding the salt solution to the latex or alternatively by placing the latex in a vessel and adding the salt solution. The coagulation of the latex is carried out continuously or batchwise. Preference is given to continuous coagulation which is carried out with the aid of nozzles.

In addition to the above-described salt or salts as electrolytes, precipitation aids can also be used in the coagulation. Possible precipitation aids are, for example, water-soluble polymers. The water-soluble polymers are non-ionic, anionic or cationic.

Examples of non-ionic polymeric precipitation aids are modified cellulose such as hydroxyalkylcellulose or methylcellulose and also adducts of ethylene oxide and propylene oxide onto compounds having an acidic hydrogen Examples of compounds having an acidic hydrogen are: fatty acids, sugars such as sorbitol, monoglycerides and diglycerides of fatty acids, phenol, alkylated phenols, (alkyl)phenol-formaldehyde condensates, etc. The addition products of ethylene oxide and propylene oxide onto these compounds can have a random or blocked structure. Among these products, preference is given to hose whose solubility decreases with increasing temperature. Characteristic clouding temperatures are in the range from 0 to ISAAC, in particular in the range from 20 to 70° C.

Examples of anionic polymeric precipitation aids are the homopolymers and copolymers of (methacrylic acid, maleic acid, maleic anhydride, etc. Preference is given to the Na salt of polyacrylic acid.

Cationic polymeric precipitation aids are usually based on polyamines or on homopolymers and copolymers of (meth) acrylamide. Preference is given to polymethacrylamides and polyamines, in particular those based on epichlorohydrin and dimethylamine.

The amounts of polymeric precipitation aids are from 0.01 to 5 parts by weight, preferably from 0.05 to 2.5 parts by weight, per 100 parts by weight of nitrile rubber.

The use of other precipitation aids is also conceivable. However, it may be remarked that it is readily possible to carry out the process of the invention with the desired success in the absence of additional precipitation aids and, in particular, in the absence of $C_1$-$C_4$-alkylcelluloses, hydroxyalkylcelluloses, plant-based protein-like materials or polysaccharides such as starch or water-soluble polyamine compounds.

The latex used for the coagulation advantageously has a solids concentration in the range from 1% to 40%, preferably in the range from 5% to 35% and particularly preferably in the range from 15 to 30% by weight.

The coagulation of the latex is carried out at a temperature above 50° C., preferably at a temperature in the range from 50 to 100° C., particularly preferably at a temperature in the range from 55 to 90° C., in particular at a temperature in the range from 60 to 90° C. When carrying out the coagulation of the latex, it is also possible for the latex and the solution of at least one salt of a monovalent metal to be initially combined at a temperature of <50° C.; it is critical that the temperature of the latex/salt mixture is subsequently increased to a temperature above 50° C.

Washing of the Coagulated Nitrile Rubber:

After the coagulation, the nitrile rubber is usually present in the form of crumb. The washing of the coagulated NBR is therefore also referred to as crumb washing. It is possible to use either deionized water, DW, or water which has not been deionized, BW, for washing this coagulated crumb. If no calcium salt is present in the indicated possible amounts (up to 5% by weight of all salts used) in the coagulation of the latex using at least one salt of a monovalent metal, it has been found to be useful to use water which has not been deionized and thus contains calcium ions in the washing of the coagulated NBR.

Washing is carried out at a temperature above 50° C., preferably at a temperature in the range from 50 to 90° C., and particularly preferably at a temperature in the range from 55 to 90° C.

The amount of washing water is from 0.5 to 20 parts by weight, preferably from 1 to 10 parts by weight and particularly preferably from 1 to 5 parts by weight, per 100 parts by weight of nitrile rubber.

The rubber crumb is preferably subjected to multistage washing, with the rubber crumb being partially dewatered between the individual washing stages. The residual moisture contents of the crumb between the individual washing stages are in the range from 5 to 50% by weight, preferably in the range from 7 to 25% by weight. The number of washing stages is usually from 1 to 7, preferably from 1 to 3. Washing is carried out batchwise or continuously. Preference is given to using a multistage, continuous process, with countercurrent washing being preferred in order to save water.

Dewatering and Drying:

After washing is complete, the nitrile rubber crumb is typically dewatered. This is usually carried out in two stages. In the first stage, the rubber crumb is subjected to preliminary mechanical dewatering. In the second stage, the remaining water is evaporated. Both preliminary dewatering and drying are preferably carried out continuously. Suitable apparatuses for the preliminary mechanical dewatering are strainer screws in which the water is squeezed out laterally via a strainer slit or screws in which mechanical dewatering is effected against the product stream (Welding principle).

The cation contents remaining in the nitrile rubber can be additionally influenced if desired by the degree of preliminary mechanical dewatering. This can be advantageous particularly when inefficient washing is employed. Efficient washing gives the appropriate cation contents immediately after washing. The water contents after preliminary mechanical dewatering are in the range from 5 to 25% by weight. To adjust the cation mix remaining in the product, it has been found to be useful for the water contents after preliminary mechanical dewatering to be from 5 to 15% by weight, in particular from 5 to 10% by weight.

Drying of the nitrite rubber which has been subjected to preliminary dewatering is carried out in a fluidized-bed dryer or in a plate dryer. The temperatures during drying are in the range from 80 to 150° C. Preference is given to drying according to a temperature programme, with the temperature being reduced towards the end of the drying process.

The nitrite rubbers of the invention which have the specified content of cations and thus an ion index in the range indicated surprisingly have the desired high vulcanization rate (difference of initial vulcanization time minus full vulcanization time) and the vulcanizates obtained have a very good modulus.

The invention therefore also provides for the use of the nitrite rubbers of the invention for producing vulcanizable mixtures containing at least one nitrite rubber according to the invention, at least one crosslinker and optionally further additives.

These vulcanizable mixtures are produced by mixing at least one nitrile rubber according to the invention, at least one crosslinker and optionally further additives.

As crosslinker, it is possible to use, for example, peroxidic crosslinkers such as bis(2,4-dichlorobenzyl)peroxide, dibenzoyl peroxide, bis(4-chlorobenzoyl)peroxide, 1,1-bis-(t-butylperoxy)-3,3,5-trimethylcyclohexane, tert-butyl perbenzoate, 2,2-bis(t-butylperoxy)butene, 4,4-di-tert-butylperoxynonyl valerate, dicumyl peroxide, 2,5-dimethyl-2,5-di(t-butylperoxy)hexane, tert-butyl cumyl peroxide, 1,3-bis(t-butylperoxyisopropyl)benzene, di-t-butyl peroxide and 2,5-dimethyl-2,5-di(t-butylperoxythex-3-yne.

It can be advantageous to use not only these peroxidic crosslinkers but also further additives by means of which the crosslinking yield can be increased: suitable additives of this type are, for example, triallyl isocyanurate, triallyl cyanurate, trimethylolpropane tri(meth)acrylate, triallyl trimellitate, ethylene glycol dimethacrylate, butanediol dimethacrylate, trimethylolpropane trimethacrylate, Zn diacrylate, Zn dimethacrylate, 1,2-polybutadiene or N,N'-m-phenylenedimaleimide.

The total amount of the crosslinker or crosslinkers is usually in the range from 1 to 20 phr, preferably in the range from 1.5 to 15 phr and particularly preferably the range from 2 to 10 phr, based on the nitrile rubber.

It is also possible to use sulphur in elemental soluble or insoluble form or sulphur donors as crosslinker.

Possible sulphur donors are, for example, dimorpholyl disulphide (DTDM), 2-morpholino-dithiobenzothiazol (MBSS), caprolactam disulphide, dipentamethylenethiuram tetrasulphide (DPTT), and tetramethylthiuram disulphide (TMTD).

In the sulphur vulcanization of the nitrile rubbers of the invention, too, it is possible to use further additives by means of which the crosslinking yield can be increased. However, crosslinking can in principle also be carried out using sulphur or sulphur donors alone.

Conversely, crosslinking of the nitrile rubbers of the invention can also be carried out only in the presence of the abovementioned additives, i.e. without addition of elemental sulphur or sulphur donors.

Suitable additives by means of which the crosslinking yield can be increased are, for example, dithiocarbamates, thiurams, thiazoles, sulphenamides, xanthogenates, guanidine derivatives, caprolactams and thiourea derivatives.

As dithiocarbamates, it is possible to use, for example: ammonium dimethyldithiocarbamate, sodium diethyldithiocarbamate (SDEC), sodium dibutyldithiocarbamate (SDEC), zinc dimethyldithiocarbamate (ZDMC), zinc diethyldithiocarbamate (ZDEC), zinc dibutyldithiocarbamate (ZDBC), zinc ethylphenyldithiocarbamate (ZEPC), zinc dibenzyldithiocarbamate (ZBEC), zinc pentamethylenedithiocarbamate (Z5MC), tellurium diethyldithiocarbamate, nickel dibutyldithiocarbamate, nickel dimethyldithiocarbamate and zinc diisononyldithiocarbamate.

As thiurams, it is possible to use, for example: tetramethylthiuram disulphide (TMTD), tetramethylthiuram monosulphide (TMTM), dimethyldiphenylthiuram disulphide, tetrabenzylthiuram disulphide, dipentamethylenethiuram tetrasulphide and tetraethylthiuram disulphide (TETD).

As thiazoles, it is possible to use, for example, 2-mercaptobenzothiazole (MBT), dibenzthiazyl disulphide (MBTS), zinc mercaptobenzothiazole (ZMBT) and copper-2-mercaptobenzothiazole.

As sulphonamide derivatives, it is possible to use, for example: N-cyclohexyl-2-benzothiazylsulphenamide (CBS). N-tert-butyl-2-enzothiazylsulphenamide (TUBS), N,N'dicyclohexyl-2-benzothiazylsulphenamide (DCBS), 2-morpholinothiobenzothiazole (MBS), N-oxydiethyleneth-iocarbamyl-N-tert-butylsulphenamide and oxydiethyleneth-iocarbamyl-N-oxy-ethylenesuiphenamide.

As xanthogenates, it is possible to use, for example: sodium dibutylxanthogenate, zinc isopropyl-dibutylxanthogenate and zinc dibutylxanthogenate.

As guanidine derivatives, it is possible to use, for example: diphenylguanidine (DPG), di-o-tolylguanidine (DOTG) and o-tolylbiguanide (OTBG).

As dithiophosphates, it is possible to use, for example: zinc dialkyldithiophosphate (chain length of the alkyl radicals: $C_2$ to $C_{16}$), copper dialkyldithiophosphates (chain length of the alkyl radicals: $C_2$ to $C_{16}$) and dithiophosphoryl polysulphide.

As caprolactam, it is possible to use, for example, dithio-bis-caprolactam.

As thiourea derivatives, it is possible to use, for example, N,N'-diphenylthiourea (DPTU), diethylthiourea (DETU) and ethylenethiourea (ETU).

Further suitable additives are, for example: zinc diaminediisocyanate, hexamethylenetetramine, 1,3-bis(citraconimidomethyl)benzene and cyclic disulphanes.

Both the additives mentioned and the crosslinkers can be used either individually or in mixtures. Preference is given to using the following substances for crosslinking the nitrile rubbers: sulphur, 2-mercaptobenzothiazol, tetramethylthiuram disulphide, tetramethylthiuram monosulphide, zinc dibenzyldithiocarbamate, dipentamethylenethiuram tetrasulphide, zinc dialkydithiophosphate, dimorpholyl disulphide, tellurium diethyldithiocarbamate, nickel dibutyldithiocarbamate, zinc dibutyldithiocarbamate, zinc dimethyldithiocarbamate and dithiobiscaprolactam.

The crosslinkers and abovementioned additives can each be used in amounts of from about 0.05 to 10 phr, preferably from 0.1 to 8 phr, in particular from 0.5 to 5 phr (single addition, in each case based on the active substance).

In sulphur crosslinking according to the invention, it may also be useful to employ further inorganic or organic substances in addition to the crosslinkers and abovementioned additives. Examples of such further substances are: zinc oxide, zinc carbonate, lead oxide, magnesium oxide, saturated or unsaturated organic fatty acids and their zinc salts, polyalcohols, amino alcohols such as triethanolamine and also amines such as dibutylamine, dicyclohexylamine, cyclohexylethylamine and polyether amines.

In addition, it is also possible to use initial vulcanization inhibitors. These include cyclohexylthiophthalimide (CTP), N,N'-dinitrosopentamethylenetetramine (DNPT), phthalic anhydride (PTA) and diphenylnitrosamine. Preference is given to cyclohexylthiophthalimide (CTP).

Apart from the addition of the crosslinker or crosslinkers, the nitrile rubber of the invention can also be mixed with further customary rubber additives.

These include, for example, the typical substances which are adequately known to those skilled in the art, for example fillers, filler activators, ozone protection agents, ageing inhibitors, antioxidants, processing aids, extender oils, plasticizers, reinforcing materials and mould release agents.

As fillers, it is possible to use, for example, carbon black, silica, barium sulphate, titanium dioxide, zinc oxide, calcium oxide, calcium carbonate, magnesium oxide, aluminium oxide, iron oxide, aluminium hydroxide, magnesium hydroxide, aluminium silicates, diatomaceous earth, talc, kaolins, bentonites, carbon nanotubes, Teflon (the latter preferably in powder form) or silicates.

Possible filler activators are, in particular, organic silanes such as vinyltrimethyloxysilane, vinyldimethoxymethylsilane, vinyltriethoxysilane, vinyltris(2-methoxyethoxy)silane, N-cyclo-hexyl-3-aminopropyltrimethoxysilane, 3-aminopropyltrimethoxysilane, methyltrimethoxysilane, methyltriethoxysilane, dimethyldimethoxysilane, dimethyldiethoxysilane, trimethylethoxysilane, isooctyltrimethoxysilane, isooctyltriethoxysilane, hexadecyltrimethoxysilane or (octadecyl)methyldimethoxysilane. Further filler activators are, for example, surface-active substances such as triethanolamine and ethylene glycols having molecular weights of from 74 to 10 000 g/mol. The amount of filler activators is usually from 0 to 10 phr, based on 100 phr of the nitrile rubber.

As ageing inhibitors, it is possible to add those which have already been described in the present application in respect of coagulation of the latex to the vulcanizable mixtures. These are usually used in amounts of about 0-5 phr, preferably from 0.5 to 3 phr, based on 100 phr of the nitrile rubber.

Possible mould release agents are, for example, saturated and partially unsaturated fatty acids and oil acids and their derivatives (fatty acid esters, fatty acid salts, fatty alcohols, fatty acid amides), which are preferably employed as constituents of the mixture, also products which can be applied to the mould surface, for example products based on low molecular weight silicone compounds, products based on fluoropolymers and products based on phenolic resins.

When used as constituents of the mixture, the mould release agents are used in amounts of about 0-10 phr, preferably from 0.5 to 5 phr, based on 100 phr of the nitrite rubber.

Reinforcement by means of strength carriers (fibres) composed of glass, according to the teachings of U.S. Pat. No. 4,826,271, is also possible as is reinforcement by means of cords, woven fabrics, fibres composed of aliphatic and aromatic polyamides (Nylon®, Aramid®), polyesters and natural fibre products.

The invention further provides a process for producing mouldings based on at least one nitrite rubber according to the invention, which is characterized in that the above-described vulcanizable mixture is vulcanized in a shaping process, preferably using an injection-moulding process.

The invention thus likewise provides the specific shaped part which can be obtained by the abovementioned vulcanization process.

This process makes it possible to produce a large number of mouldings, e.g. a seal, a cap, a hose or a diaphragm. The nitrile rubbers of the invention having the specific ion index are particularly suitable for producing an O-ring seal, a flat seal, a corrugated sealing ring, a sealing sleeve, a sealing cap, a dust protection cap, a plug seal, a thermalinsulation hose (with or without addition of PVC), an oil cooler hose, an air intake hose, a servo control hose or a pump diaphragm.

In the alternative to the direct preparation of shaped parts on the basis of the inventive nitrite rubbers it is also possible that the preparation of the inventive nitrite rubber is followed either (i) by a metathetic degradation process or (ii) a metathetic degradation process and a subsequent hydrogenation or (iii) only a hydrogenation. This metathetic degradation process and the hydrogenation reactions are both adequately known to those skilled in the art and described in literature.

The metathesis is e.g. known from WO-A-02/100941 as well as from WO-A-02/100905.

It is possible to carry out the hydrogenation with use of homogeneous or heterogeneous hydrogenation catalysts. It is also possible to carry out the hydrogenation in situ, i.e. in the same reaction vessel in which the optional metathetic degradation has previously also been carried out and without the necessity of isolating the degraded nitrite rubber. The hydrogenation catalyst is simply added to the reaction vessel.

The catalysts used are usually based on rhodium, ruthenium or titanium, but it is also possible to use platinum, iridium, palladium, rhenium, ruthenium, osmium, cobalt or copper either as metal or preferably in the form of metal compounds (cf., for example. U.S. Pat. No. 3,700,637, DE-A-25 39 132, EP-A-0 134 023, DE-A-35 41 689, DE-A-35 40 918, EP-A-0 298 386, DE-A-35 29 252, DE-A-34 33 392, U.S. Pat. No. 4,464,515 and U.S. Pat. No. 4,503,196).

Suitable catalysts and solvents for a hydrogenation in the homogeneous phase are described below and are also known from DE-A-25 39 132 and EP-A-0 471 250.

The selective hydrogenation can be achieved, for example, in the presence of a rhodium- or ruthenium-containing catalyst. It is possible to use, for example, a catalyst of the general formula

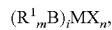

where M is ruthenium or rhodium, the radicals $R^1$ are identical or different and are each a $C_1$-$C_8$-alkyl group, a $C_4$-$C_8$-cycloalkyl group, a $C_6$-$C_{15}$-aryl group or a $C_7$-$C_{15}$-aralkyl group. B is phosphorus, arsenic, sulphur or a sulphoxide group S=O, X is hydrogen or an anion, preferably halogen and particularly preferably chlorine or bromine, l is 2, 3 or 4, m is 2 or 3 and n is 1, 2 or 3, preferably 1 or 3. Preferred catalysts are tris(triphenylphosphine)rhodium(I) chloride, tris(triphenylphosphine)rhodium(III) chloride and tris(dimethyl sulphoxide)rhodium(III) chloride and also tetrakis (triphenylphosphine)rhodium hydride of the formula $(C_6H_5)_3P)_4RhH$ and the corresponding compounds in which the triphenylphosphine has been completely or partly replaced by tricyclohexylphosphine. The catalyst can be utilized in small amounts. An amount in the range 0.01-1% by weight, preferably in the range 0.03-0.5% by weight and particularly preferably in the range 0.1-0.3% by weight, based on the weight of the polymer, is suitable.

It is usually appropriate to use the catalyst together with a co-catalyst which is a ligand of the formula $R^1{}_mB$, where $R^1$, m and B have the meanings given above for the catalyst. Preferably, m is 3, B is phosphorus and the radicals $R^1$ can be identical or different. Preference is given to cocatalysts having trialkyl, tricycloalkyl, triaryl, triaralkyl, diaryl-monoalkyl, diaryl-monocycloalkyl, dialkyl-monoaryl, dialkyl-monocycloalkyl, dicycloalkyl-monoaryl or dicycloalkyl-monoaryl radicals.

Examples of co-catalysts may be found in, for example. U.S. Pat. No. 4,631,315. A preferred cocatalyst is triphenylphosphine. The co-catalyst is preferably used in amounts in the range 0.3-5% by weight, preferably in the range 0.54% by weight, based on the weight of the nitrile rubber to be hydrogenated. Furthermore, the weight ratio of the rhodium-containing catalyst to the cocatalyst is preferably in the range from 1:3 to 1:55, more preferably in the range from 1:5 to 1:45. Based on 100 parts by weight of the nitrile rubber to be hydrogenated, it is appropriate to use from 0.1 to 33 parts by weight of the cocatalyst, preferably from 0.5 to 20 parts by weight and very particularly preferably from 1 to 5 parts by weight, in particular more than 2 but less than 5 parts by weight, of cocatalyst per 100 parts by weight of the nitrite rubber to be hydrogenated.

The practical implementation of this hydrogenation is adequately known to those skilled in the art from U.S. Pat. No. 6,683,136. It is usually carried out by treating the nitrite rubber to be hydrogenated in a solvent such as toluene or monochlorobenzene with hydrogen at a temperature in the range from 100 to 150° C. and a pressure in the range from 50 to 150 bar for from 2 to 10 hours.

For the purposes of the present invention, hydrogenation is a reaction of the double bonds present in the starting nitrite rubber to an extent of at least 50%, preferably 70-100%, particularly preferably 80-100%.

When heterogeneous catalysts are used, these are usually supported catalysts based on palladium which are, for example, supported on carbon, silica, calcium carbonate or barium sulphate.

In analogy to the inventive nitrite rubbers the optionally hydrogenated nitrite rubbers obtained after the metathesis and/or hydrogenation reaction of the inventive nitrite rubber may be incorporated into a vulcanizable mixture and used for producing mouldings and shaped parts. Such optionally hydrogenated nitrite rubbers have a Mooney-viscosity (ML (1+4@100° C.)) of 1 to 50, preferably of from 1 to 40 Mooney units.

EXAMPLES

General

I Determination of the Cation Contents

To determine the cation contents, 0.5 g of the nitrile rubbers were digested by dry ashing at 550° c. in a platinum crucible with subsequent distillation of the ash in hydrochloric acid. After appropriate dilution of the digestion solution with deionized water, the metal contents are measured by ICP-OFS (inductively coupled plasma-optical emission spectrometry) at the following wavelengths:

Calcium: 317.933 nm,
Magnesium: 285,213 nm,
Potassium: 766.491 nm,
Sodium: 589.592 nm against calibration solutions matched to the acid matrix. Depending on the concentration of the elements in the digestion solution and the sensitivity of the measuring instrument used, the concentrations of the sample solutions were matched to the linear region of the calibration for the wavelengths used in each case (description of this method of measurement in B. Weelz "Atomic Absorption Spectrometry", 2nd Ed., Verlag Chemie, Weinheim 1985)

II Initial Vulcanization Behaviour and Vulcanization Rate

The initial vulcanization behaviour (Mooney scorch) is determined at 120° C. by means of a shear disc viscosimeter in accordance with DIN 53 523. A small rotor (S) is used for the determination. "MS 5 (120° C.)" is the time in minutes during which the Mooney value increases by 5 Mooney units from the minimum value.

The vulcanization rate is determined at 160° C. in accordance with DIN 53 529, part 3, by means of a rheometer from Monsanto (MDR 2000E) as the difference $t_{90}$-$t_{10}$, where $t_{10}$ and $t_{90}$ are the vulcanization times at which 10% and 90%, respectively, of the finale degree of vulcanization are attained.

The vulcanization behaviour of the mixtures was determined in the rheometer at 160° C. in accordance with DIN 53 529. In this way, the characteristic vulcanization times $t_{10}$ and $t_{90}$ were determined.

III Mechanical Properties

The mechanical properties of the rubbers (e.g. stress at various elongations, ultimate tensile strength and elongation at break) are determined on vulcanizates in accordance with DIN 53 504.

A NBR Production by Emulsion Polymerization

An NBR latex was produced on the basis of the formulations shown in Table 1 below. Amounts of alt starting materials are given in parts by weight per 100 parts by weight of the monomer mixture. The polymerization was carried out at a temperature of 17° C. for a period of 13.5 hours until a polymerization conversion of 80% had been reached.

TABLE 1

| Starting materials | Parts by weight |
|---|---|
| Butadiene | 73 |
| Acrylonitrile | 27 |
| Total amount of water | 174 + 16 + 30 |
| Erkantol ® BXG[1] | 3.67 |
| Baykanol ® PQ[2] | 1.10 |
| K salt of coconut fatty acid | 0.73 |
| KOH | 0.05 |
| t-DDM[3] | 0.24 + 0.24 |
| Potassium peroxodisulphate[4] | 0.39 + 0.19 |
| Tris(α-hydroxyethyl)amine[5] | 0.55 |
| Na dithionite[6] | 1.19 |
| Potassium hydroxide | 1.28 |
| Vulkanox ® KB[7] | 1.25 |

[1] Sodium salt of a mixture of monosulphonated and disulphonated naphthalenesulphonic acids having isobutylene oligomer substituents (Erkantol ® BXG)
[2] Sodium salt of methylenebisnaphthalene sulphonate (Baykanol ® PQ, Lanxess Deutschland GmbH)
[3] t-DDM (tertiary dodecyl mercaptane): $C_{12}$-mercaptane mixture from Lanxess Deutschland GmbH
[4] Aldrich catalogue number: 21,622-4
[5] Aldrich catalogue number: T5,830-0
[6] Aldrich catalogue number: 15,795-3
[7] 2,6-di-tert-butyl-p-cresol from Lanxess Deutschland GmbH The NBR latex was produced batchwise in a 2 m³ autoclave provided with a stirrer.

350 kg of the monomer mixture and a total amount of water of 770 kg were used in the batch. The emulsifiers Erkantol® BXG (12.85 kg), Baykanol® PQ (3.85 kg) and the potassium salt of coconut fatty acid (2.56 kg) and 84 g of sodium hydroxide together with 609 kg of the water were placed in the autoclave and flushed by means of a stream of nitrogen. Thereafter, the destabilized monomers (255.5 kg of butadiene and 94.5 kg of acrylonitrile) and part of the regulator t-DDM (0.84 kg) were introduced into the reactor. The remaining amount of water (161 kg) was used for preparing the aqueous solutions of tris(α-hydroxyethyl)amine, potassium peroxodisulphate and sodium dithionite.

The polymerization was started at 17° C. by addition of aqueous solutions of 1.365 kg of potassium peroxodisulphate (corresponding to the 0.39 part by weight shown in Table 1) and 1.925 kg of tris(α-hydroxyethyl)amine (corresponding to the 0.55 part by weight shown in Table 1) and the polymerization mixture was maintained at this temperature over the entire polymerization time. The course of the polymerization was followed by gravimetric determinations of the conversion. At a polymerization conversion of 15%, a further 0.84 kg of regulator t-DDM (corresponding to the 0.24 part by weight shown in Table 1) and 0.665 kg of potassium peroxodisulphate (corresponding to the 0.19 parts by weight shown in Table 1) were introduced. When a conversion of 75% had been reached after 10.5 hours, the polymerization was stopped by addition of 4.165 kg of sodium dithionite (1.19 parts by weight) and 4.48 kg of potassium hydroxide (1.28 parts by weight) dissolved in 105 kg of water (30 parts by weight). Unreacted monomers and other volatile constituents were removed by means of steam distillation.

The characteristic data of the latex obtained are summarized in Table 2 below.

TABLE 2

|  | Latex |
|---|---|
| Particle diameter ($d_{50}$) [nm] | 360 |
| Solids content [% by weight] | 18.9 |
| pH value | 8.9 |
| Acrylonitrile content [% by weight] | 28.9 |

Before coagulation. 1.25 parts by weight of Vulkanox®KB based on 100 parts by weight of the monomer mixture used in the polymerization were added to the latex (cf. Table 1). In this case Vulkanox® KB was added to the latex as a 50% strength aqueous dispersion.

The aqueous Vulkanox® KB-dispersion was prepared at 95-98° C. by means of an Ultraturrax and comprised.

| 360 g | of deionized water (DW) |
| 40 g | of alkylphenol polyglycol ether (EmulgatorNP10; Lanxess Deutschland GmbH) |
| 400 g | of 2,6-di-tert-butyl-p-cresol (Vulkanox ® KB; Lanxess Deutschland GmbH) |

B Work-Up of the Latex

The concentration of the salt solution and the amounts of salt used for the precipitation were in each case calculated without water of crystallization. The salts used in the coagulation of the latex, the concentration of the salt solutions, the amounts of salt used based on the nitrile rubber, the temperature of the latex during the addition of salt, the temperature of the latex/salt mixture after heating, the temperature during washing and the duration of washing are listed in the following tables.

In the examples according to the invention, the minimum amounts of sodium chloride required for quantitative coagulation of the latex were determined in preliminary tests, so that the minimum amounts of salt necessary for quantitative coagulation of the latex were used in each of these examples.

25 kg of latex were in each case worked up to produce the solid. Coagulation of the latex was carried out batchwise in a stirrable, open vessel having a capacity of 100 l. Here, the latex was placed in the coagulation vessel, then heated to the temperatures shown in column 6 of Tables 3 and 4 if these were above 20° C., the aqueous salt solution was subsequently added at this temperature while stirring and the reaction mixture was then heated to the temperatures shown in column 7 of Tables 3 and 4.

For washing of the crumb, the 100 litre coagulation vessel was equipped with an inlet and outlet. Two rails were installed on the inside of the vessel so that the outlet could be shut off by means of a screen (mesh opening 2 mm) before washing was carried out, so that the coagulated crumb was not discharged with the water during washing. Washing was carried out at a constant water throughput of 200 l/h. Either deionized and thus calcium-free water (DW) or calcium-containing water (BW) was used for washing depending on the example.

In the major part of the examples, the latex serum obtained during coagulation of the latex was not removed from the coagulation vessel before commencement of washing; i.e. the latex serum was removed by dilution washing. The boundary conditions employed in washing of the crumb (type of water, washing temperature, washing time, etc.) are listed in the following tables.

After washing was complete, the rubber crumb was taken out with the aid of a sieve, subjected to preliminary dewatering to residual moisture contents of from 5 to 10% by weight in a Welding screw and dried batchwise to a residual moisture content of <1.5% by weight at 70° C. in a vacuum drying oven.

The conditions employed in the work-up of the latex of the nitrite rubber are summarized in Tables 3 and 4.

Table 5 summarizes the ion indices for the examples according to the invention and the comparative examples

TABLE 3

Examples 1-5 according to the invention
The NaCl solutions used for the coagulation of the latex were prepared using deionized water (DW) in Examples 1-4 according to the invention. In Example 5, the NaCl solution was prepared using Ca-containing water (BW).

| | | | Precipitation conditions | | | | | | |
|---|---|---|---|---|---|---|---|---|---|
| | pH of the latex | Type of Salt | Conc. of the salt solution [% by weight] | Amount of salt based on NBR [% by weight] | Temperature of the latex present on addition of salt [° C.] | Temperature after heating of the crumb dispersion [° C.] | Washing conditions | | |
| Example | | | | | | | Type of water | T [° C.] | Time [h] |
| 1[1] | 8.9 | NaCl | 15 | 65 | 45 | 70 | BW | 60 | 0.5 |
| 2[2] | 8.9 | NaCl | 18 | 63 | 70 | 70 | BW | 70 | 5.0 |
| 3[3] | 9.7 | NaCl | 26 | 54.3 | 20 | 60 | BW | 60 | 8 |
| 4 | 8.9 | NaCl | 26 | 28 | 60 | 60 | BW | 60 | 5.0 |
| 5[3] | 9.7 | NaCl | 26 | 54.3 | 20 | 60 | BW | 60 | 8 |

[1] In Experiment 1, the rubber crumb obtained in the coagulation of the latex was washed in a single stage, with the crumb being isolated from the serum of the coagulated latex with the aid of a sieve before washing and dewatered under gravity. The residence time for washing was 0.5 h.
[2] In Experiment 2, the latex was added to the NaCl solution which had been heated to 70° C. and was being stirred.
[3] The pH of the latex was set using 5% strength aqueous potassium hydroxide solution before coagulation of the latex.

TABLE 4

Comparative Examples C6-C13 which are not according to the invention
In Comparative Example 9, Ca-containing water (BW) was used for the preparation of the NaCl solution used for coagulation of the latex. In the other comparative examples shown in Tab. 4, deionized water (DW) was used for preparing the electrolyte solutions used for coagulation of the latex.

| | | | Precipitation conditions | | | | | | |
|---|---|---|---|---|---|---|---|---|---|
| | pH of the latex | Type of salt | Conc. of the salt solution [% by weight] | Amount of salt based on NBR [% by weight] | Temperature of the initially charged latex before addition of salt [° C.] | Temperature after heating of the crumb dispersion [° C.] | Washing conditions | | |
| Example | | | | | | | Type of water | T [° C.] | Time [h] |
| C6[1] | 9.5 | NaCl | 15 | 150 | 20 | 20 | BW | 20 | 8.0 |
| C7 | 8.4 | NaCl | 15 | 150 | 20 | 20 | BW | 20 | 2.5 |
| C8 | 8.4 | NaCl | 26 | 54 | 50 | 50 | BW | 40 | 5.0 |
| C9 | 8.4 | NaCl | 26 | 54 | 50 | 50 | BW | 30 | 9.0 |
| C10 | 8.4 | $CaCl_2$ | 0.3 | 3 | 20 | 20 | DW | 20 | 3.8 |

TABLE 4-continued

Comparative Examples C6-C13 which are not according to the invention
In Comparative Example 9, Ca-containing water (BW) was used for the preparation of the NaCl
solution used for coagulation of the latex. In the other comparative examples shown in Tab. 4,
deionized water (DW) was used for preparing the electrolyte solutions used for coagulation of the
latex.

| | | Precipitation conditions | | | | Washing conditions | | |
|---|---|---|---|---|---|---|---|---|
| Example | pH of the latex | Type of salt | Conc. of the salt solution [% by weight] | Amount of salt based on NBR [% by weight] | Temperature of the initially charged latex before addition of salt [°C.] | Temperature after heating of the crumb dispersion [°C.] | Type of water | T [°C.] | Time [h] |
| C11 | 8.4 | CaCl$_2$ | 0.6 | 6 | 20 | 20 | DW | 20 | 3.8 |
| C12 | 8.4 | CaCl$_2$ | 1.2 | 12 | 20 | 20 | DW | 20 | 3.5 |
| C13[2)] | 5.8 | CaCl$_2$ | 1.2 | 12 | 20 | 20 | DW | 20 | 3.4 |

[1)]The pH of the latex was set using 5% strength aqueous KOH solution before coagulation of the latex
[2)]The pH of the latex was set using 5% strength aqueous HCl before coagulation of the latex Determination of the ion indices gives the following values.

TABLE 5

Ion indices of the nitrile rubbers from Examples 1-5 and 6-13

| | | Ion contents | | | | |
|---|---|---|---|---|---|---|
| Example | Type of salt | Ca [ppm] | Mg [ppm] | Na [ppm] | K [ppm] | II |
| 1 | NaCl | 620 | 22 | 570 | 17 | 21.3 |
| 2 | NaCl | 565 | 21 | 575 | 17 | 16.9 |
| 3 | NaCl | 450 | 16 | 201 | 8 | 24.8 |
| 4 | NaCl | 435 | 14 | 105 | 10 | 25.7 |
| 5 | NaCl | 325 | 19 | 110 | 12 | 19.3 |
| C6 | NaCl | 540 | 25 | 95 | 10 | 36.1 |
| C7 | NaCl | 960 | 34 | 625 | 27 | 44.1 |
| C8 | NaCl | 570 | 18 | 230 | 14 | 32.4 |
| C9 | NaCl | 590 | 22 | 223 | 11 | 34.3 |
| C10 | CaCl$_2$ | 1190 | 6 | 17 | 1 | 88.5 |
| C11 | CaCl$_2$ | 1290 | 3 | 12 | 1 | 96.2 |
| C12 | CaCl$_2$ | 1240 | 2 | 6 | 1 | 92.7 |
| C13 | CaCl$_2$ | 1235 | 2 | 8 | 1 | 92.3 |

To determine the properties of the unvulcanized rubber mixture and of the vulcanizates, rubber mixtures based on the nitrile rubbers were produced in a 1.5 l laboratory mixer, with the individual constituents of the mixture being mixed in the order indicated in Table 6. All constituents of the mixture are based on 1 parts by weight of the nitrile rubber. The properties of the vulcanizates based on the nitrile rubbers according to the invention and the comparative experiments are summarized in Table 7.

TABLE 6

| Constituent of the mixture | Amount in parts by weight |
|---|---|
| NBR | 100.0 |
| Stearic acid | 2.0 |
| Zinc oxide | 5.0 |
| Carbon black N 330 | 40.0 |
| Phenol/formaldehyde resin (Plastikator ® FH) | 5.0 |
| N-cyclohexylbenzthiazylsulphenamide (Vulkacit ® CZ, Lanxess Deutschland GmbH) | 0.9 |
| Sulphur | 1.5 |

TABLE 7

Further properties of the nitrile rubbers from Examples 1-5 and 6-13

| | | | Vulcanization | | | | Vulcanizate properties | | |
|---|---|---|---|---|---|---|---|---|---|
| | | | MS 5 (120° C.) [min] | $t_{10}$ [sec] | $t_{90}$ [sec] | $t_{90} - t_{10}$ [sec] | $\sigma_{300}$ [MPa] | $\sigma_{max.}$ [MPa] | $\epsilon_b$ [%] |
| Example | Type of salt | II | | | | | | | |
| 1 | NaCl | 21.3 | 47 | 6.5 | 10.7 | 4.2 | 8.5 | 22.4 | 579 |
| 2 | NaCl | 16.9 | 43 | 6.2 | 11.4 | 5.2 | 8.7 | 24.2 | 595 |
| 3 | NaCl | 24.8 | 44 | 7 | 12.5 | 5.5 | 8.9 | 21.6 | 545 |
| 4 | NaCl | 25.7 | 44 | 6.9 | 11.6 | 4.7 | 8.5 | 23.8 | 611 |
| 5 | NaCl | 26.0 | 45 | 6.7 | 11.7 | 5.0 | 9.3 | 22.2 | 535 |
| 6 | NaCl | 36.1 | 46 | 6.4 | 12.6 | 6.2 | 7.9 | 21.0 | 581 |
| 7 | NaCl | 44.1 | 45 | 6.6 | 12.6 | 6.0 | 8.3 | 22.0 | 569 |
| 8 | NaCl | 32.4 | 43 | 6.8 | 13.8 | 7.0 | 8.0 | 22.1 | 595 |
| 9 | NaCl | 34.3 | 45 | 6.6 | 14.1 | 7.5 | 7.9 | 23.7 | 598 |
| 10 | CaCl$_2$ | 88.5 | 56 | 7.1 | 14.7 | 7.6 | 7.4 | 21.0 | 608 |
| 11 | CaCl$_2$ | 96.2 | 59 | 8.2 | 16.7 | 8.5 | 7.1 | 21.5 | 649 |

TABLE 7-continued

Further properties of the nitrile rubbers from Examples 1-5 and 6-13

| | | | Vulcanization | | | | Vulcanizate properties | | |
| | | | MS 5 | | | | | | |
| Example | Type of salt | II | (120° C.) [min] | $t_{10}$ [sec] | $t_{90}$ [sec] | $t_{90} - t_{10}$ [sec] | $\sigma_{300}$ [MPa] | $\sigma_{max.}$ [MPa] | $\epsilon_b$ [%] |
|---|---|---|---|---|---|---|---|---|---|
| 12 | CaCl$_2$ | 92.7 | 56 | 8.0 | 18.2 | 10.2 | 7.1 | 21.6 | 648 |
| 13 | CaCl$_2$ | 92.3 | 62 | 8.7 | 17.6 | 8.9 | 7.0 | 21.6 | 651 |

It can be seen from Table 7 that the nitrite rubbers having the ion indices according to the invention have a higher vulcanization rate $t_{90}-t_{10}$ and also higher stress values at 30% elongation after vulcanization. This comparison clearly shows the advantages of the nitrile rubbers produced according to the invention.

What is claimed is:

1. A nitrile rubber comprising repeating units of at least one α,β-unsaturated nitrile and at least one conjugated diene and having an ion index ("II") according to the general formula (I) in the range from 7 to 26 ppm×mol/g, $$\text{ion index} = \frac{3\,c(\text{Ca}^{2+})}{40\,\text{g/mol}} - \left[\frac{c(\text{Na}^+)}{23\,\text{g/mol}} + \frac{c(\text{K}^+)}{39\,\text{g/mol}}\right] \quad (I)$$

where $c(\text{Ca}^{2+})$, $c(\text{Na}^+)$ and $c(\text{K}^+)$ indicate the concentrations of the calcium, sodium and potassium ions in the nitrile rubber in ppm and wherein the concentration of calcium ions, $c(\text{Ca}^{2+})$, is from 325 to 620 ppm, the concentration of sodium ions, $c(\text{Na}^+)$, is from 105 to 575 ppm, and the concentration of potassium ions, $c(\text{K}^+)$, is from 8 to 17 ppm.

2. The nitrile rubber according to claim 1 having an ion index in the range from 8 to 26 ppm×mol/g.

3. The nitrile rubber according to claim 1 having repeating units of acrylonitrile and 1,3-butadiene.

4. The nitrile rubber according to claim 3 having repeating units of one or more α,β-unsaturated monocarboxylic or dicarboxylic acids, their esters or amides.

5. The nitrile rubber according to claim 4 having repeating units of an alkyl ester of an α,β-unsaturated carboxylic acid.

6. The nitrile rubber according to claim 1 which has a Mooney viscosity (ML (1+4 @ 100° C.)) of from 10 to 150 Mooney units.

7. The nitrile rubber according to claim 1 which has a Mooney viscosity (ML (1+4 @ 100° C.)) of from 20 to 100 Mooney units.

8. The nitrile rubber according to claim 1 having a glass transition temperature in the range from −70° C. to +10° C.

9. The nitrile rubber according to claim 1 having a glass transition temperature in the range from −60° C. to 0° C.

10. A process for producing a nitrile rubber, comprising:
emulsion polymerization of at least one α,β-unsaturated nitrile and at least one conjugated diene, and optionally one or more further copolymerizable monomers, whereby a latex containing nitrile rubber is formed;
coagulating the nitrile rubber of the latex, whereby a coagulated nitrile rubber is obtained; and
washing the coagulated nitrile rubber, whereby the nitrile rubber is formed, and
wherein
the emulsion polymerization is carried out in the presence of at least one alkyl thiol containing 12-16 carbon atoms and at least three tertiary carbon atoms, with the sulphur being bound to one of these tertiary carbon atoms, and
wherein the pH of the latex obtained in the emulsion polymerization is set to at least 6 before the coagulating step and wherein the coagulating step is performed using at least one salt of a monovalent metal and with not more than 5% by weight of salts of at least one divalent metal, based on the total amount of all salts used for the coagulating step, and
wherein a temperature of at least 50° C. is set both during the coagulating and washing steps; and
wherein the nitrile rubber comprises repeating units of at least one α,β-unsaturated nitrile and at least one conjugated diene and having an ion index ("II") according to the general formula (I) in the range from 7 to 26 ppm× mol/g, $$\text{ion index} = \frac{3\,c(\text{Ca}^{2+})}{40\,\text{g/mol}} - \left[\frac{c(\text{Na}^+)}{23\,\text{g/mol}} + \frac{c(\text{K}^+)}{39\,\text{g/mol}}\right] \quad (I)$$

where $c(\text{Ca}^{2+})$, $c(\text{Na}^+)$ and $c(\text{K}^+)$ indicate the concentrations of the calcium, sodium and potassium ions in the nitrile rubber in ppm and wherein the concentration of calcium ions, $c(\text{Ca}^{2+})$, is from 325 to 620 ppm, the concentration of sodium ions, $c(\text{Na}^+)$, is from 105 to 575 ppm, and the concentration of potassium ions, $c(\text{K}^+)$, is from 8 to 17 ppm.

11. The process according to claim 10, wherein the emulsion polymerization is carried out batchwise or continuously in a cascade of stirred vessels.

12. The process according to claim 10, wherein one or more ageing inhibitors are added before or during the coagulating step.

13. The process according to claim 10, wherein the at least one salt of a monovalent metal comprises at least one salt of sodium or potassium.

14. The process according to claim 10, wherein at least one halide of a monovalent metal is used for coagulation of the latex during the coagulating step.

15. The process according to claim 14, wherein the at least one halide is sodium chloride or potassium chloride.

16. The process according to claim 10, wherein the at least one salt of a monovalent metal comprises at least one nitrate of monovalent metal.

17. The process according to claim 16, wherein the at least one nitrate is sodium nitrate or potassium nitrate.

18. The process according to claim 10, wherein the at least one salt of a monovalent metal comprises at least one sulphate of a monovalent metal.

19. The process according to claim 18, wherein the at least one sulphate is a sodium sulphate or potassium sulphate.

20. The process according to claim 10, wherein the at least one salt of a monovalent metal comprises at least the salt of a monovalent metal cation and a monovalent anion.

21. The process according to claim 10, wherein the at least one salt of a monovalent metal comprises a mixture of two or more salts of a monovalent metal, with the salts being able to be different salts of the same monovalent metal or various salts of various monovalent metals.

22. The process according to claim 10, wherein the at least one divalent metal is present during the coagulating step.

23. The process according to claim 10, wherein the at least one salt of a monovalent metal comprises sodium chloride and potassium chloride and, wherein the amount of potassium chloride is X % by weight, with the value of X % by weight being 40% by weight minus the % by weight of calcium chloride.

24. The process according to claim 10, wherein the at least one salt of a monovalent metal is present in the amount of 1-200 parts by weight.

25. The process according to claim 24, wherein the amount of the salt or salts of the monovalent metal is 5-150 parts by weight.

26. The process according to claim 10, wherein the at least one salt of a monovalent metal is present in the amount of 10-100 parts by weight, per 100 parts by weight of the nitrile rubber.

27. The process according to claim 10, wherein the latex used for the coagulating step has a solids concentration in the range from 1% to 40% by weight.

28. The process according to claim 27, where in the latex used for the coagulating step has a solids concentration in the range from 5% to 35% by weight.

29. The process according to claim 28, wherein the latex used for the coagulating step has a solids concentration in the range from 15 to 30% by weight.

30. The process according to claim 10, wherein the coagulating step is carried out at a temperature in the range from 50 to 100° C.

31. The process according to claim 30, wherein the coagulating step is carried out at a temperature range from 55 to 90° C.

32. The process according to claim 31, wherein the coagulating step is carried out at a temperature range from 60 to 90° C.

33. The process according to claim 10, wherein the latex and the solution of at least one salt of a monovalent metal are firstly combined at a temperature of <50° C., thereby forming a latex/salt mixture, and the temperature of the latex/salt mixture is subsequently increased to a temperature above 50° C.

34. The process according to claim 10, wherein deionized water ("DW") or water which has not been deionized ("BW") is used for washing of the coagulated nitrile rubber per the washing step.

35. The process according to claim 10, wherein the washing step is carried out at a temperature in the range from 50 to 90° C.

36. The process according to claim 35, wherein the washing step is carried out at a temperature in the range from 55 to 90° C.

37. The process according to claim 10, wherein the obtained nitrile rubber is subsequently subjected either (i) to a metathetic degradation reaction, (ii) a metathetic degradation reaction and a subsequent hydrogenation, or (iii) only a hydrogenation reaction.

38. A hydrogenated nitrile rubber prepared by subjecting a nitrile rubber according to claim 1 to either (i) a metathetic degradation reaction and a subsequent hydrogenation, or (ii) a hydrogenation reaction.

39. A vulcanizable mixture comprising at least one nitrile rubber according to claim 1, at least one crosslinker and optionally further additives.

40. A vulcanizable mixture comprising at least one hydrogenated nitrile rubber according to claim 38, at least one crosslinker and optionally further additives.

41. A process for producing a vulcanizable mixture according to claim 39 by mixing at least one nitrile rubber comprising repeating units of at least one α,β-unsaturated nitrile, at least one conjugated diene and optionally one or more further copolymerizable monomers and has an ion index ("II") according to the general formula (I) in the range from 7 to 26 ppm×mol/g, $$\text{ion index} = \frac{3\,c(\text{Ca}^{2+})}{40\,\text{g/mol}} - \left[\frac{c(\text{Na}^+)}{23\,\text{g/mol}} + \frac{c(\text{K}^+)}{39\,\text{g/mol}}\right] \quad (I)$$

where $c(\text{Ca}^{2+})$, $c(\text{Na}^+)$ and $c(\text{K}^+)$ indicate the concentrations of the calcium, sodium and potassium ions in the nitrile rubber in ppm, at least one crosslinker and optionally further additives and wherein the concentration of calcium ions, $c(\text{Ca}^{2+})$, is from 325 to 620 ppm, the concentration of sodium ions, $c(\text{Na}^+)$, is from 105 to 575 ppm, and the concentration of potassium ions, $c(\text{K}^+)$, is from 8 to 17 ppm.

42. A process for producing a vulcanizable mixture having at least one hydrogenated nitrile rubber according to claim 38, at least one crosslinker and optionally further additives, comprising the steps of mixing the at least one hydrogenated nitrile rubber, the at least one crosslinker and optionally the further additives.

43. A process for producing mouldings comprising vulcanizing nitrile rubber according to claim 1.

44. A process for producing mouldings comprising vulcanizing a hydrogenated nitrile rubber according to claim 38.

45. A moulding obtained by a process comprising vulcanizing, in a shaping process, a nitrile rubber according to claim 1.

46. A moulding obtained by the process comprising vulcanizing, in a shaping process, a hydrogenated nitrile rubber according to claim 38.

47. The moulding according to claim 45 wherein said moulding is in the shape of a seal, a cap, a hose or a diaphragm, in particular an O-ring seal, a flat seal, a corrugated sealing ring, a sealing sleeve, a sealing cap, a dust protection cap, a plug seal, a thermal insulation hose (with or without addition of PVC), an oil cooler hose, an air intake hose, a servo control hose or a pump diaphragm.

48. The moulding according to claim 43 wherein said moulding is in the shape of a seal, a cap, a hose or a diaphragm, in particular an O-ring seal, a flat seal, a corrugated sealing ring, a sealing sleeve, a sealing cap, a dust protection cap, a plug seal, a thermal insulation hose (with or without addition of PVC), an oil cooler hose, an air intake hose, a servo control hose or a pump diaphragm.

* * * * *